(12) United States Patent
Joyce

(10) Patent No.: US 7,561,310 B2
(45) Date of Patent: Jul. 14, 2009

(54) METHOD AND APPARATUS FOR DIGITAL SCANNING AND ARCHIVING

(75) Inventor: Paul A. Joyce, Akron, OH (US)

(73) Assignee: Market Hatch Co., Inc., Akron, OH (US)

( * ) Notice: Subject to any disclaimer, the term of this patent is extended or adjusted under 35 U.S.C. 154(b) by 1115 days.

(21) Appl. No.: 10/835,161

(22) Filed: Apr. 29, 2004

(65) Prior Publication Data

US 2005/0135708 A1 Jun. 23, 2005

Related U.S. Application Data

(60) Provisional application No. 60/530,177, filed on Dec. 17, 2003.

(51) Int. Cl.
*H04N 1/40* (2006.01)
*G06K 15/00* (2006.01)

(52) U.S. Cl. .................. 358/462; 358/1.12; 358/1.18

(58) Field of Classification Search .......... 358/1.5, 358/1.12, 1.18, 462, 453, 470, 404, 444, 358/496, 494; 707/204; 711/161
See application file for complete search history.

(56) References Cited

U.S. PATENT DOCUMENTS

| | | | |
|---|---|---|---|
| 4,899,292 A | 2/1990 | Montagna et al. | |
| 4,958,235 A | 9/1990 | Sims et al. | |
| 4,992,940 A | 2/1991 | Dworkin | |
| 5,640,000 A * | 6/1997 | Spriet et al. | 235/375 |
| 5,754,308 A | 5/1998 | Lopresti et al. | |
| 5,978,477 A | 11/1999 | Hull et al. | |
| 6,546,313 B2 | 4/2003 | Nakahira et al. | |
| 6,700,603 B1 * | 3/2004 | Okuchi et al. | 348/126 |
| 2002/0029703 A1 * | 3/2002 | Kubota et al. | 101/115 |
| 2002/0057455 A1 * | 5/2002 | Gotoh et al. | 358/1.15 |
| 2002/0106235 A1 * | 8/2002 | Jones | 402/73 |
| 2002/0189517 A1 * | 12/2002 | Pettigrew et al. | 112/475.19 |
| 2003/0033319 A1 | 2/2003 | Van Der et al. | |
| 2003/0133156 A1 | 7/2003 | Cragun et al. | |
| 2003/0167248 A1 * | 9/2003 | Silvano | 706/48 |
| 2003/0230845 A1 * | 12/2003 | Fujii et al. | 271/176 |
| 2004/0161320 A1 * | 8/2004 | Svyatsky et al. | 414/404 |

FOREIGN PATENT DOCUMENTS

DE 2451939 * 5/1975

* cited by examiner

*Primary Examiner*—Jerome Grant, II
(74) *Attorney, Agent, or Firm*—Brouse McDowell; John M. Skeriotis

(57) ABSTRACT

A new and improved method for digital scanning and archiving is disclosed herein. The method includes sorting the associated documents into separate files, placing the files onto a movable table, digitally imaging the associated documents, coding the processed files, the coding relating to the post-processing procedure, and disposing of the files in accordance with the coding.

18 Claims, 6 Drawing Sheets

METHOD AND APPARATUS FOR DIGITAL SCANNING AND ARCHIVING

This application claims priority to a provisional application, Ser. No. 60/530,177, filed Dec. 17, 2003, entitled Method and Apparatus for Digital Scanning and Archiving.

I. BACKGROUND OF THE INVENTION

A. Field of Invention

This invention pertains to the art of methods and apparatuses for digital archiving, and more particularly to a method of processing documents before, during, and after digital imaging.

B. Description of the Related Art

The rapid growth in the creation and dissemination of digital objects by authors, publishers, corporations, governments, and even librarians, archivists, and museum curators, has emphasized the speed and ease of short-term dissemination with little regard for the long-term preservation of digital information. However, digital information is fragile in ways that differ from traditional technologies, such as paper or microfilm. It is more easily corrupted or altered without recognition. Digital storage media have shorter life spans, and digital information requires access technologies that are changing at an ever-increasing pace. Some types of information, such as multimedia, are so closely linked to the software and hardware technologies that they cannot be used outside these proprietary environments. Because of the speed of technological advances, the time frame in which we must consider archiving becomes much shorter. The time between manufacture and preservation is shrinking.

While there are traditions of stewardship and best practices that have become institutionalized in the print environment, many of these traditions are inadequate, inappropriate, or not well known among the stakeholders in the digital environment. Originators are able to bypass the traditional publishing, dissemination, and announcement processes that are part of the traditional path from creation to archiving and preservation. Groups and individuals who did not previously consider themselves to be archivists are now being drawn into the role, either because of the infrastructure and intellectual property issues involved or because user groups are demanding it. Librarians and archivists who traditionally managed the life cycle of print information from creation to long-term preservation and archiving, must now look to information managers from the computer science tradition to support the development of a system of stewardship in the new digital environment. There is a need to identify new best practices that satisfy the requirements and are practical for the various stakeholder groups involved.

In an effort to advance the state-of-the-art and practice of digital archiving, the International Council for Scientific and Technical Information (ICSTI), a community of scientific and technical information organizations that includes national libraries, research institutes, publishers, and bibliographic database producers, sponsored a study in March 1999. This study is the most recent in a series of efforts on the part of ICSTI to highlight the importance of digital archiving. The topic was first raised in the joint UNESCO/International Council of Scientific Unions (ICSU) Conference on Electronic Publishing in 1996. The topic was highlighted at the technical session of the June 1997 Annual ICSTI meeting and a working group was formed. The Electronic Publications Archive Working Group presented a white paper of the major issues in December 1998. At its December 1998 meeting, the ICSTI Board approved the study on which this report is based.

Based on common interest in this topic, CENDI, an interagency working group of scientific and technical information managers in the U.S. federal government, cosponsored the study.

The study began with an initial survey of the ICSTI and CENDI membership, a literature review and contacts with experts in order to identify digital archiving projects. Over 30 projects were identified, from which 18 were selected as the most "cutting edge." The highlighted projects covered six countries (U.S. (9), UK (2), Canada (1), Australia (1), Sweden (1), and Finland (1)) and four international organizations. They came from a variety of sectors including government scientific and technical programs, national archives, national libraries, publishers, and research institutes.

Project managers from the selected projects were asked a series of questions aimed at identifying emerging models and best practices for digital archiving. While technologies for storage and retrieval were discussed, technology was of secondary interest to the understanding of policy and practice.

For purposes of the study, "digital archiving" was defined as the long-term storage, preservation and access to information that is "born digital" (created and disseminated primarily in electronic form) or for which the digital version is considered to be the primary archive. [The study did not include the digitization of material from another medium unless the digital became the primary version.] The study aimed to provide new insights into digital archiving issues elicited by many of the baseline studies and white papers on digital archiving. Primary attention was given to operational and prototype projects involving scientific and technical information at an international level. It included a variety of digital format types applicable to scientific and technical information, including data, text, images, audio, video and multimedia; and a variety of object types, such as electronic journals, monographs, satellite imagery, biological sequence data, and patents. The results, while not scientifically valid, identify emerging models and best practices for digital archives in an effort to support the development of a tradition of digital stewardship.

The project managers from the "cutting edge" projects emphasized the importance of considering best practices for archiving at all stages of the information management life cycle. Acknowledging this important philosophy, the best practices identified by the study are presented in the framework of the information life cycle—creation, acquisition, cataloging/identification, storage, preservation, and access.

Creation is the act of producing the information product. The producer may be a human author or originator, or a piece of equipment such as a sensing device, satellite, or laboratory instrument. Creation is viewed here in the broadest sense, as, increasingly, science is based on a variety of data types, products, and originators.

All project managers acknowledged that creation is where long-term archiving and preservation must start. Even in rigorously controlled situations, the digital information may be lost without the initial awareness on the part of the originator of the importance of archiving. Practices used when a digital object is created ultimately impact the ease with which the object can be digitally archived and preserved.

In addition, there are several key practices involving the creator that are evolving within the archiving projects. First, the creator may be involved in assessing the long-term value of the information. In lieu of other assessment factors, the creator's estimate of the long-term value of the information may be a good indication of the value that will be placed on it by people within the same discipline or area of research in the future. The U.S. Department of Agriculture's Digital Publications Preservation Steering Committee has suggested that the creator provide a preservation indicator in the document. This would not take the place of formal retention schedules, but it would provide an indication of the long-term value that the creator, as a practicing researcher, attaches to the document's contents.

Secondly, the preservation and archiving process is made more efficient when attention is paid to issues of consistency, format, standardization, and metadata description in the very beginning of the information life cycle. The Oak Ridge National Laboratory (Tennessee, USA) recently announced guidelines for the creation of digital documents. Limits are placed on both the software that can be used and on the format and layout of the documents in order to make short and long-term information management easier.

Many project managers acknowledged that the best practice would be to create the metadata at the object creation stage, or to create the metadata in stages, with the metadata provided at creation augmented by additional elements during the cataloging/identification stage. However, only in the case of data objects is the metadata routinely collected at the point of creation. Many of the datasets are created by measurement or monitoring instruments, and the metadata is supplied along with the data stream. This may include location, instrument type, and other quality indicators concerning the context of the measurement. In some cases, this instrument-generated metadata is supplemented by information provided by the original researcher.

For smaller datasets and other objects such as documents and images, much of the metadata continues to be created "by hand" and after-the-fact. Metadata creation is not sufficiently incorporated into the tools for the creation of these objects to rely solely on the creation process. As standards groups and vendors move to incorporate XML (eXtensible Mark-up Language) and RDF (Resource Description Framework) architectures in their word processing and database products, the creation of metadata as part of the origination of the object will be easier.

Acquisition and collection development is the stage in which the created object is "incorporated" physically or virtually into the archive. The object must be known to the archive administration. There are two main aspects to the acquisition of digital objects—collection policies and gathering procedures.

In most countries, the major difference in collection policies between formal print and electronic publications is the question of whether digital materials are included under current deposit legislation. Guidelines help to establish the boundaries in such an unregulated situation. It is also the case that there is just too much material that could be archived from the Internet, so guidelines are needed to tailor the general collection practices of the organization. The collection policies answer questions related to selecting what to archive, determining extent, archiving links, and refreshing site contents.

Both the National Library of Canada (NLC) and the National Library of Australia (NLA) acknowledge the importance of selection guidelines. The NLC's Guidelines state, "The main difficulty in extending legal deposit to network publishing is that legal deposit is a relatively indiscriminate acquisition mechanism that aims at comprehensiveness. In the network environment, any individual with access to the Internet can be a publisher, and the network publishing process does not always provide the initial screening and selection at the manuscript stage on which libraries have traditionally relied in the print environment.... Selection policies are, therefore, needed to ensure the collection of publications of lasting cultural and research value."

While the scope of NLA's PANDORA (Preserving and Accessing Networked DOcumentary Resources of Australia) Project is only to preserve Australian Internet publishing, the NLA also acknowledges that it is still impossible to archive everything. Therefore, the NLA has formulated guidelines for the *Selection of Online Australian Publications Intended for Preservation by the National Library of Australia.* These guidelines are key to the successful networking of the state libraries into the National Collection of Australian Electronic Publications, since they provide consistency across multiple acquisition activities. Scholarly publications of national significance and those of current and long term research value are archived comprehensively. Other items are archived on a selective basis "to provide a broad cultural snapshot of how Australians are using the Internet to disseminate information, express opinions, lobby, and publish their creative work."

Directly connected to the question of selection is the issue of extent. What is the extent or the boundary of a particular digital work? This is particularly an issue when selecting complex Web sites.

"[For PANDORA] internal links only are archived. Both higher and lower links on the site are explored to establish which components form a title that stands on its own for the purposes of preservation and cataloguing . . . preference is given to breaking down large sites into component titles and selecting those that meet the guidelines. However, sometimes the components of larger publications or sites do not stand well on their own but together do form a valuable source of information. In this case, if it fits the guidelines, the site should be selected for archiving as an entity."

The extensive use of hypertext links to other digital objects in electronic publications raises the question of whether these links and their content should be archived along with the source item. This issue has been addressed by the selected projects in a variety of ways.

Most organizations archive the links (the URLs or other identifiers) but not the content of the linked objects. The American Institute of Physics archives the links embedded in the text and references of its electronic journal articles but not the text or content of any of these links, unless the linked item happens to be in its publication archive or in the supplemental material which it also archives. Similarly, the Office of Scientific and Technical Information of the U.S. Department of Energy (DOE OSTI) does not intentionally archive any links beyond the extent of the digital object itself. However, the document may be linked to another document if that document is another DOE document in the OSTI archive. NLA's decision about archiving the content of linked objects is based on its selection guidelines. If a linked item meets the selection guidelines, it's contents will be archived, otherwise it will not be.

In a slightly different approach, the NLC has chosen to archive the text of the linked object only if it is on the same server as the object that is being archived. The NLC cites difficulties in tracking down hypertext links and acquiring the linked objects as the reason for its decision not to include the content of other links. The previous issue of the same periodical, accessed through a hypertext link, would be considered a part of the original publication. Another publication accessed through a hypertext link would not be considered part of the original publication.

Only two of the reviewed projects archive the content of all links. Brewster Kahle's Internet Archive retains all links (unless they are to "off-limits" sites), because the aim of the project is to archive a snapshot of the entire Internet. Within a specific domain, the American Astronomical Society also maintains all links to both documents and supporting materials in other formats, based on extensive collaboration among the various international astronomical societies, researchers, universities, and government agencies. Each organization archives its own publications, but links are maintained not only from references in the full text and cited references of the articles, but between and among the major international astronomical databases. Within this specific domain, the contents of all linked objects are available.

In cases where the archiving is taking place while changes or updates may still be occurring to the digital object, as in the case of on-going Web sites, there is a need to consider refreshing the archived contents. A balance must be struck between the completeness and currency of the archive and the burden on the system resources. Obviously, the burden of refreshing the content increases as the number of sources stored in the archive increases. For example, NLA allocates a gathering schedule to each "publication" in its automatic harvesting program. The options include on/off, weekly, monthly, quarterly, half-yearly, every nine months, or annually. The selection is dependent on the degree of change expected and the overall stability of the site.

There are two general approaches to the gathering of relevant Internet-based information—hand-selected and automatic. In the case of the NLA, the sites are reviewed and hand-selected. They are monitored for their persistence before being included in the archive. Alternatively, the Royal Library, the National Library of Sweden, acquires material by periodically running a robot to capture sites for its Kulturarw project without making value judgments. The harvester automatically captures sites from the .se country domain and from known Web servers that are located in Sweden even though they have .com extensions. In addition, some material is obtained from foreign sites with material about Sweden, such as travel information or translations of Swedish literature. While the acquisition is automatic, the National Library gives priority to periodicals, static documents, and HTML pages. Conferences, usenet groups, ftp archives, and databases are considered lower priority.

The EVA Project at the University of Helsinki, National Library of Finland uses techniques similar to those used in Sweden. However, the guidelines from EVA address issues to be considered when using robots for harvesting. In order not to overload the servers being harvested, particularly those belonging to the public networks, the EVA guidelines establish time limits between visits to a single Web server and between capturing and recapturing a single URL. Even though this approach has allowed the EVA project to progress, developers at EVA consider this approach to be "very rough and not flexible enough for archiving purposes." The EVA developers would prefer that the time limits be more configurable at the server and, preferably, at the individual URL levels. The flexibility would require that the scheduler be a database application that can be modified by the librarian.

Once the archive has acquired the digital object, it is necessary to identify and catalog it. Both identification and cataloging allow the archiving organization to manage the digital objects over time. Identification provides a unique key for finding the object and linking that object to other related objects. Cataloging in the form of metadata supports organization, access and curation. Cataloging and identification practices are often related to what is being archived and the resources available for managing the archive.

All archives use some form of metadata for description, reuse, administration, and preservation of the archived object. There are issues related to how the metadata is created, the metadata standards and content rules that are used, the level at which metadata is applied and where the metadata is stored.

The majority of the projects created metadata in whole or part at the cataloging stage. However, there is increasing interest in automatic generation of metadata, since the manual creation of metadata is considered to be a major impediment to digital archiving. A project is underway at the U.S. Environmental Protection Agency to derive metadata at the data element level from legacy databases. The Defense Information Technology Testbed (DITT) Project within the U.S. Department of Defense is also investigating automated metadata generation.

A variety of metadata formats are used by the selected projects, depending on the data type, discipline, resources available, and cataloging approaches used. Most national libraries use traditional library cataloging standards with some fields unable to be filled and others taking on new meaning. All titles in the NLA's PANDORA Archive receive full MARC cataloging by the Electronic Unit Staff. However, several newer abbreviated formats developed specifically for Web-based resources are also in use. EVA uses a Dublin Core-like format. It is anticipated that an abbreviated format such as the Dublin Core may facilitate receipt of metadata directly from the publisher, eliminating the need for extensive library cataloging.

There is even a greater variety of content standards used by the projects when entering data into the metadata fields. The national libraries tend to use traditional library cataloging rules such as AACR2. Some communities, such as the geospatial community, have information standards, such as latitude and longitude, which are easily incorporated as metadata content standards. However, work remains to identify the specific metadata elements needed for long-term preservation as opposed to discovery, particularly for non-textual data types like images, video and multimedia.

The level at which metadata is applied depends on the type of data and the anticipated access needs. Datasets are generally cataloged at the file or collection level. Electronic journal articles may be cataloged individually, sometimes with no concern about metadata for the issue or journal title levels. Homepages provide a particularly difficult problem for determining the level at which metadata should be applied. Generally, the metadata is applied to whatever level is considered to be the full extent of the intellectual resource.

In the projects reviewed, the metadata files generally are stored separately from the archives themselves. Libraries may store the metadata in their online public access catalogs. Publishers may store the metadata in a bibliographic or citation database. However, in some instances, such as electronic journals with tagged headers for title, authors, author affiliation, etc., the information may be stored with the object itself and extracted for the catalog. In the case of distributed archives, the metadata may be stored centrally, with the objects distributed throughout the network, or the metadata may be stored as embedded tags in the digital resource. Discussions surrounding the interoperability of archives, both within and across disciplines, focus on the need to be able to crosswalk or translate between the various metadata formats. This is key to the development of networked, heterogeneous archives. The Open Archival Information System (OAIS) Reference Model developed by the ISO Consultative Committee for Space Data Systems addresses this issue by encapsulating specific metadata as needed for each object type in a consistent data model. The Long Term Environmental Research (LTER) Network has developed mechanisms for "fitting" its network-specific metadata information into the broader scheme of the Federal Geographic Data Committee content standard for geographic data and other standards related to ecology.

For those archives that do not copy the digital material immediately into the archive, the movement of material from server to server or from directory to directory on the network, resulting in a change in the URL, is problematic. The use of the server as the location identifier can result in a lack of persistence over time both for the source object and any linked objects.

Despite possible problems, most archives continue to use the URL when referencing the location for the digital object. However, there are some projects that are changing this practice. The OClC archive uses PURLs, persistent identifiers to which the changeable URL is mapped. The American Chemical Society uses the Digital Object Identifier for its journal articles and also maintains the original Manuscript Number assigned to the item at the beginning of the publication process. The Defense Technical Information Center of the U.S. Department of Defense is using the Handle® system developed by CNRI.

A multifaceted identification system is used by the American Astronomical Society (AAS). Name resolution is used instead of URLs. In addition, the AAS uses astronomy's standard identifier, called a "Bibcode," which has been in use for fifteen years. In the spring of 1999, AAS added PubRef numbers (a linkage mechanism originally developed by the U.S. National Library of Medicine); other identifiers can be added as needed to maintain links.

Storage is often treated as a passive stage in the life cycle, but storage media and formats have changed with legacy information perhaps lost forever. Block sizes, tape sizes, tape drive mechanisms and operating systems have changed over time. Most organizations that responded to the question about the periodicity of media migration anticipate a 3-5 year cycle.

The most common solution to this problem of changing storage media is migration to new storage systems. This is expensive, and there is always concern about the loss of data or problems with the quality when a transfer is made. Check algorithms are extremely important when this approach is used.

The most rigorous media migration practices are in place at the data centers. The Atmospheric Radiation Monitoring (ARM) Center at the Oak Ridge National Laboratory plans to migrate to new technologies every 4-5 years. During each migration, the data is copied to the new technology. Each migration will require 6-12 months. According to Ray McCord of the ARM Center, "This is a major effort and may become nearly continuous as the size [of the archive] increases."

Preservation is the aspect of archival management that preserves the content as well as the look and feel of the digital object. While the study showed that there is no common agreement on the definition of long-term preservation, the time frame can be thought of as long enough to be concerned about changes in technology and changes in the user community. Depending on the particular technologies and subject disciplines involved, the project managers interviewed estimated the cycle for hardware/software migration at 2-10 years.

New releases of databases, spreadsheets, and word processors can be expected at least every two to three years, with patches and minor updates released more often. While software vendors generally provide migration strategies or upward compatibility for some generations of their products, this may not be true beyond one or two generations. Migration is not guaranteed to work for all data types, and it becomes particularly unreliable if the information product has used sophisticated software features. There is generally no backward compatibility, and if it is possible, there is certainly loss of integrity in the result.

Plans are less rigorous for migrating to new hardware and applications software than for storage media. In order to guard against major hardware/software migration issues, the organizations try to procure mainstream commercial technologies. For example, both the American Chemical Society and the U.S. Environmental Protection Agency purchased Oracle not only for its data management capabilities but for the company's longevity and ability to impact standards development. Unfortunately, this level of standardization and ease of migration is not as readily available among technologies used in specialized fields where niche systems are required because of the interfaces to instrumentation and the volume of data to be stored and manipulated.

Emulation, which encapsulates the behavior of the hardware/software with the object, is being considered as an alternative to migration. For example, a MS Word 2000 document would be labeled as such and then metadata information provided that indicates how to reconstruct such a document is at the engineering—bits and bytes—level. An alternative to encapsulating the software with every instance of the data type is to create an emulation registry that uniquely identifies the hardware and software environments and provides information on how to recreate the environment in order to preserve the use of the digital object.

At this time, there is no system in place to provide the extensive documentation and emulation information required for this approach to be operable, particularly to allow an archive to deal with the variety of older technologies. Most importantly, there is no policy that requires the manufacturers to deposit the emulation information.

At the specific format level, there are several approaches used to save the "look and feel" of material. For journal articles, the majority of the projects reviewed use image files (TIFF), PDF, or HTML. TIFF is the most prevalent for those organizations that are involved in any way with the conversion of paper backfires. For example, JSTOR, a non-profit organization that supports both storage of current journal issues in electronic format and conversion of back issues, processes everything from paper into TIFF and then scans the TIFF image. The OCR, because it cannot achieve 100% accuracy, is used only for searching; the TIFF image is the actual delivery format that the user sees. However, this does not allow the embedded references to be active hyperlinks.

HTML/SGML (Standard Generalized Mark-up Language) is used by many large publishers after years of converting publication systems from proprietary formats to SGML. The American Astronomical Society (AAS) has a richly encoded SGML format that is used as the archival format from which numerous other formats and products are made. The SGML version that is actually stored by the publisher is converted to HTML. PDF versions can also be provided by conversion routines.

For purely electronic documents, PDF is the most prevalent format. This provides a replica of the Postscript format of the document, but relies upon proprietary encoding technologies. PDF is used both for formal publications and grey literature. The National Library of Sweden transforms dissertations that are received in formats other than PDF to PDF and HTML. While PDF is increasingly accepted, concerns remain for long-term preservation and it may not be accepted as a legal depository format, because of its proprietary nature.

Preserving the "look and feel" is difficult in the text environment, but it is even more difficult in the multimedia environment, where there is a tightly coupled interplay between software, hardware and content. The U.S. Department of Defense DITT Project is developing models and software for the management of multimedia objects. Similarly, the University of California at San Diego has developed a model for object-based archiving that allows various levels and types of metadata with distributed storage of various data types. The UCSD work is funded by the U.S. National Archives and Records Administration and the U.S. Patent and Trademark Office.

A preservation issue is the format in which the archival version should be stored. Transformation is the process of converting the native format to a standard format. On the whole, the projects reviewed favored storage in native formats. However, there are several examples of data transformation. AAS and ACS transform the incoming files into SGML-tagged ASCII format. The AAS believes that "The electronic master copy, if done well, is able to serve as the robust electronic archival copy. Such a well-tagged copy can be updated periodically, at very little cost, to take advantage of advances in both technology and standards. The content remains unchanged, but the public electronic version can be updated to remain compatible with the advances in browsers and other access technology."

The data community also provides some examples of data transformation. For example, the NASA Data Active Archive Centers (DAACs) transform incoming satellite and ground-monitoring information into standard Common Data Format. The U.K.'s National Digital Archive of Datasets (NDAD) transforms the native format into one of its own devising, since NDAD could not find an existing standard that dealt with all their metadata needs. These transformed formats are considered to be the archival versions, but the bit-wise copies are retained, so that someone can replicate what the center has done.

One of the paradoxes of the networked environment is that in an environment that is so dynamic and open to change, there is a greater and greater emphasis on standards. Those projects that have been archiving for a long period of time indicated that while they started out with a large number of incoming formats—primarily textual—the number of formats have decreased. DOE OSTI began its project with a limited number of acceptable input formats, because there were so many different native formats. In the political environment of that time, it was difficult to gain support for the standardization of word processing packages. However, documents are currently received in only a few formats. Text is received in SGML (and its relatives HTML and XML), PDF (Normal and Image), WordPerfect and Word. Images are received in TIFF Group 4 and PDF Image.

The market forces have reduced the number of major word processing vendors. To a lesser extent, consolidation has occurred in the number of spreadsheet and database formats. However, there is less consistency in the modeling, simulation and specific purpose software areas; much of this software continues to be specific to the project. Therefore, the emphasis in these areas is on the development of standards for interoperability and data exchange (e.g., the Open GIS Consortium for interoperability between geographic information systems), realizing that perhaps the market forces will not play as large a role here as with more general purpose software applications.

The previous life cycle functions that have been discussed are performed for the purpose of ensuring continuous access to the material in the archive. Successful practices must consider changes to access mechanisms, as well as rights management and security requirements over the long term.

Most project managers interviewed consider the access and display mechanisms to be another source of change in the digital environment. Today it is the Web, but there is no way of knowing what it might be tomorrow. It may be possible in the future to enhance the quality of presentation of items from the digital archive based on advances in digitization and browser technologies. NLM's *Profiles in Science* product creates an electronic archive of the photographs, text, videos, etc. that are provided by donors to this project. This electronic archive is used to create new access versions as the access mechanisms change. However, the originals are always retained. Project manager Alexa McCray stated that "The evolution of technology has shown that whatever level of detail is captured in the conversion process, it will eventually become insufficient. New hardware and software will make it possible to capture and display at higher quality over time. It is always desirable to capture and recapture using the original item."

One of the most difficult access issues for digital archiving involves rights management. What rights does the archive have? What rights do various user groups have? What rights has the owner retained? How will the access mechanism interact with the archive's metadata to ensure that these rights are managed properly? Rights management includes providing or restricting access as appropriate, and changing the access rights as the material's copyright and security level changes.

Security and version control also impact digital archiving. Brewster Kahle raises many interesting questions concerning privacy and "stolen information," particularly since the Internet Archive policy is to archive all sites that are linked to one another in one long chain. Similarly, there is concern among image archivists that images can be tampered with without the tampering being detected. Particularly in cases where conservation issues are at stake, it is important to have metadata to manage encryption, watermarks, digital signatures, etc. that can survive despite changes in the format and media on which the digital item is stored.

Within the sciences, there are a variety of digital archiving projects that are at the operational or pilot stage. A review of the cutting-edge projects shows the beginning of a body of best practices for digital archiving across the stages of the information life cycle.

Standards for creating digital objects and metadata description, which specifically address archiving issues, are being developed at the organization and discipline levels. Regardless of whether acquisition is done by human selection or automated gathering software, there is a growing body of guidelines to support questions of what to select, the extent of the digital work, the archiving of related links and refreshing the contents of sites. Standards for cataloging and persistent, unique identification are important in order to make the material known to the archive administration. A variety of metadata formats, content rules and identification schemes are currently in use, with an emphasis on crosswalks to support interoperability, while standardizing as much as possible. Issues of storage and preservation (maintaining the look and feel of the content) are closely linked to the continuous development of new technologies. Current practice is to migrate from one storage medium, hardware configuration and software format to the next. This is an arduous and expensive process that may be eliminated if emulation strategies are developed among standards groups and hardware and software manufacturers. Access mechanisms, being hardware and software based, have their own migration issues. In addition, there are concerns about rights management, security and version control at the access and re-use stage of the life cycle.

While there are still many issues to be resolved and technology continues to develop a-pace, there are hopeful signs that the early adopters in the area of digital archiving are providing lessons-learned that can be adopted by others in the stakeholder communities. Through the collaborative efforts of the various stakeholder groups—creators, librarians, archivists, funding sources, and publishers—and the involvement of information managers, a new tradition of stewardship will be developed to ensure the preservation and continued access to our scientific and technological heritage.

Digital images are electronic snapshots taken of a scene or scanned from documents, such as photographs, manuscripts, printed texts, and artwork. The digital image is sampled and mapped as a grid of dots or picture elements (pixels). Each pixel is assigned a tonal value (black, white, shades of gray or color), which is represented in binary code (zeros and ones). The binary digits ("bits") for each pixel are stored in a sequence by a computer and often reduced to a mathematical representation (compressed). The bits are then interpreted and read by the computer to produce an analog version for display or printing.

Pixel Values: In a bi-tonal image, each pixel is assigned a tonal value, for example 0 for black and 1 for white.

Resolution is the ability to distinguish fine spatial detail. The spatial frequency at which a digital image is sampled (the sampling frequency) is often a good indicator of resolution. This is why dots-per-inch (dpi) or pixels-per-inch (ppi) are common and synonymous terms used to express resolution for digital images. Generally, but within limits, increasing the sampling frequency also helps to increase resolution.

Pixels: Individual pixels can be seen by zooming in an image.

Pixel dimensions are the horizontal and vertical measurements of an image expressed in pixels. The pixel dimensions may be determined by multiplying both the width and the height by the dpi. A digital camera will also have pixel dimensions, expressed as the number of pixels horizontally and vertically that define its resolution (e.g., 2,048 by 3,072). Calculate the dpi achieved by dividing a document's dimension into the corresponding pixel dimension against which it is aligned. An 8"×10" document that is scanned at 300 dpi has the pixel dimensions of 2,400 pixels (8"×300 dpi) by 3,000 pixels (10"×300 dpi).

Bit depth is determined by the number of bits used to define each pixel. The greater the bit depth, the greater the number of tones (grayscale or color) that can be represented. Digital images may be produced in black and white (bi-tonal), grayscale, or color.

A bi-tonal image is represented by pixels consisting of 1 bit each, which can represent two tones (typically black and white), using the values 0 for black and 1 for white or vice versa.

A grayscale image is composed of pixels represented by multiple bits of information, typically ranging from 2 to 8 bits or more.

Example: In a 2-bit image, there are four possible combinations: 00, 01, 10, and 11. If "00" represents black, and "11" represents white then "01" equals dark and "10" equals light gray. The bit depth is two, but the number of tones that can be represented is $2^2$ or 4. At 8 bits, 256 ($2^8$) different tones can be assigned to each pixel.

A color image is typically represented by a bit depth ranging from 8 to 24 or higher. With a 24-bit image, the bits are often divided into three groupings: 8 for red, 8 for green, and 8 for blue. Combinations of those bits are used to represent other colors. A 24-bit image offers 16.7 million ($2^{24}$) color values. Increasingly scanners are capturing 10 bits or more per color channel and often outputting 8 bits to compensate for "noise" in the scanner and to present an image that more closely mimics human perception.

Binary calculations for the number of tones represented by common bit depths:

1 bit ($2^1$)=2 tones
2 bits ($2^2$)=4 tones
3 bits ($2^3$)=8 tones
4 bits ($2^4$)=16 tones
8 bits ($2^8$)=256 tones
16 bits ($2^{16}$)=65,536 tones
24 bits ($2^{24}$)=16.7 million tones Dynamic range is the range of tonal difference between the lightest light and darkest dark of an image. The higher the dynamic range, the more potential shades can be represented, although the dynamic range does not automatically correlate to the number of tones reproduced. For instance, high-contrast microfilm exhibits a broad dynamic range, but renders few tones. Dynamic range also describes a digital system's ability to reproduce tonal information. This capability is most important for continuous-tone documents that exhibit smoothly varying tones, and for photographs it may be the single most important aspect of image quality.

File size is calculated by multiplying the surface area of a document (height×width) to be scanned by the bit depth and the $dpi^2$. Because image file size is represented in bytes, which are made up of 8 bits, divide this figure by 8.

Formula 1 for File Size
$$\text{File Size} = (\text{height} \times \text{width} \times \text{bit depth} \times dpi^2)/8$$

If the pixel dimensions are given, multiply them by each other and the bit depth to determine the number of bits in an image file. For instance, if a 24-bit image is captured with a digital camera with pixel dimensions of 2,048×3,072, then the file size equals (2048×3072×24)/8, or 18,874,368 bytes.

Formula 2 for File Size
$$\text{File Size} = (\text{pixel dimensions} \times \text{bit depth})/8$$

File size naming convention: Because digital images often result in very large files, the number of bytes is usually represented in increments of $2^{10}$ (1,024) or more:

1 Kilobyte (KB)=1,024 bytes
1 Megabyte (MB)=1,024 KB
1 Gigabyte (GB)=1,024 MB
1 Terabyte (TB)=1,024 GB Compression is used to reduce image file size for storage, processing, and transmission. The file size for digital images can be quite large, taxing the computing and networking capabilities of many systems. All compression techniques abbreviate the string of binary code in an uncompressed image to a form of mathematical shorthand, based on complex algorithms. There are standard and proprietary compression techniques available. In general it is better to utilize a standard and broadly supported one than a proprietary one that may offer more efficient compression and/or better quality, but which may not lend itself to long-term use or digital preservation strategies. There is considerable debate in the library and archival community over the use of compression in master image files.

Compression schemes can be further characterized as either lossless or lossy. Lossless schemes, such as ITU-T.6, abbreviate the binary code without discarding any information, so that when the image is "decompressed" it is bit for bit identical to the original. Lossy schemes, such as JPEG, utilize a means for averaging or discarding the least significant information, based on an understanding of visual perception. However, it may be extremely difficult to detect the effects of lossy compression, and the image may be considered "visually lossless." Lossless compression is most often used with bi-tonal scanning of textual material. Lossy compression is typically used with tonal images, and in particular continuous tone images where merely abbreviating the information will not result in any appreciable file savings.

Emerging compression schemes offer the capability of providing multi-resolution images from a single file, providing flexibility in the delivery and presentation of images to end users.

File formats consist of both the bits that comprise the image and header information on how to read and interpret the file. File formats vary in terms of resolution, bit-depth, color capabilities, and support for compression and metadata.

The following issues should also be considered in choosing materials for digital conversion. Under each category, pose and answer a range of questions such as the ones suggested in order to highlight their effect on selection.

Document Attributes

Does the material lend itself to digitization? Can the informational content be adequately captured in digital form? Do the physical formats and condition of the material represent major impediments? Are intermediates, such as microfilm or slides, available and in good condition? How large and complex in terms of document variety is the collection?

Preservation Considerations

Would the material be put at risk in the digitization process? Would digital surrogates reduce use of the originals, thereby offering them protection from handling? Is the digital reproduction seen as a means to replace the originals?

Organization and Available Documentation

Is the material in a coherent, logically structured order? Is it paginated or is the arrangement suggested by some other means? Is it complete? Is there adequate descriptive, navigational, or structural information about the material, such as bibliographic records or a detailed finding aid?

Intended Uses

What kinds, level, and frequency of use are envisioned? Is there a clear understanding of user requirements? Can digitization support these uses? Will access to the material be significantly enhanced by digitization? Can your institution support a range of uses, e.g., printing, browsing, detailed review? Are there issues around security or access that must be taken into account (e.g., access restricted to certain people or use under certain conditions?)

Digital Collection Building

Is there added incentive to digitize material based on the availability of complementary digital resources (including data and metadata?) Is there an opportunity for multi-institutional cooperation? For building thematic coherence or "critical mass?"

Duplication of Effort

Has the material already been digitized by another trusted source? If so, do the digital files possess sufficient quality, documentation, and functionality to serve your purposes? What conditions govern access and use of those files?

Institutional Capabilities

Does your institution have the requisite technical infrastructure to manage, deliver, and maintain digitized materials? Do your principal users have adequate computing and connectivity to make effective use of these materials?

Finances

Can you determine the total cost of image acquisition (selection, preparation, capture, indexing, and quality control)? Is this cost justified based on real or perceived benefits accruing from digitization? Are there funds to support this effort? Is there institutional commitment to the on-going management and preservation of these files?

Digital image capture must take into consideration the technical processes involved in converting from analog to digital representation as well as the attributes of the source documents themselves: physical size and presentation, level of detail, tonal range, and presence of color. Documents may also be characterized by the production process used to create them, including manual, machine, photographic, and more recently, electronic means. Further, all paper-and film-based documents will fall into one of the following five categories that will affect their digital recording.

Document Types

Printed Text/Simple Line Art—distinct edge-based representation, with no tonal variation, such as a book containing text and simple line graphics Manuscripts—soft, edge-based representations that are produced by hand or machine, but do not exhibit the distinct edges typical of machine processes, such as a letter or line drawing Halftones—reproduction of graphic or photographic materials represented by a grid of variably sized, regularly spaced pattern of dots or lines, often placed at an angle. Includes some graphic art as well, e.g., engravings Continuous Tone—items such as photographs, watercolors, and some finely inscribed line art that exhibit smoothly or subtly varying tones Mixed—documents containing two or more of the categories listed above, such as illustrated books Scanning Factors Affecting Image Quality Resolution/threshold Increasing resolution enables the capture of finer detail. At some point, however, added resolution will not result in an appreciable gain in image quality, only larger file size. The key is to determine the resolution necessary to capture all significant detail present in the source document.

Effects of Resolution on Image Quality: As the resolution increases, the gain in image quality levels off.

The threshold setting in bi-tonal scanning defines the point on a scale, ranging from 0 (black) to 255 (white), at which the gray values captured will be converted to black or white pixels.

Increasing the bit depth, or number of bits used to represent each pixel, enables the capture of more gray shades or color tones. Dynamic range is the term used to express the full range of tonal variations from lightest light to darkest dark. A scanner's capability to capture dynamic range is governed by the bit depth used and output as well as system performance.

Increasing the bit depth will affect resolution requirements, file size, and the compression method used.

Enhancement processes improve scanning quality but their use raises concerns about fidelity and authenticity. Many institutions argue against enhancing master images, limiting it to access files only. Typical enhancement features in scanner software or image editing tools include descreening, despeckling, deskewing, sharpening, use of custom filters, and bit-depth adjustment.

Capturing and conveying color appearance is arguably the most difficult aspect of digital imaging. Good color reproduction depends on a number of variables, such as the level of illumination at the time of capture, the bit depth captured and output, the capabilities of the scanning system, and mathematical representation of color information as the image moves across the digitization chain and from one color space to another.

Color Shift: Image with an overall red cast (left) and original colors (right).

The equipment used and its performance over time will affect image quality. Different systems with the same stated capabilities (e.g., dpi, bit depth, and dynamic range) may produce dramatically different results. System performance is measured via tests that check for resolution, tone reproduction, color rendering, noise, and artifacts.

System Performance: Note the difference in image quality of the alpha-numeric characters scanned on three different systems at the same resolution and bit depth.

The file format for master images should support the resolution, bit-depth, color information, and metadata you need. For example, there is little sense in creating a full color image, only to save it in a format that cannot support more than 8 bits (e.g., GIF). The format should also handle being stored uncompressed or compressed using either lossless and lossy techniques. It should be open and well-documented, widely supported, and cross-platform compatible. Although there is interest in other formats, such as PNG, SPIFF, and Flashpix, most cultural institutions rely on TIFF to store their master images. For access, derivative images in other formats may be created.

Lossy compression can have a pronounced impact on image quality, especially if the level of compression is high. In general, the richer the file, the more efficient and sustainable the compression. For instance, a bi-tonal scan of a page at 600 dpi is 4 times larger than a 300 dpi version, but often only twice as large in its compressed state. The more complex the image, the poorer the level of compression that can be obtained in a lossless or visually lossless state. With photographs, lossless compression schemes often provide around a 2:1 file size ratio; with lossy compression above 10 or 20:1, the effect may be obvious.

There are compelling preservation, access, and economic reasons for creating a rich digital master image file (sometimes referred to as an archival image) in which all significant information contained in the source document is represented.

Preservation

Creating a rich digital master can contribute to preservation in at least three ways:

1. Protecting vulnerable originals. The image surrogate must be rich enough to reduce or eliminate the user's need to view the original.
2. Replacing originals. Under certain circumstances, digital images can be created to replace originals or used to produce paper copies or Computer Output Microfilm. The digital replacement must satisfy all research, legal, and fiscal requirements.
3. Preserving digital files. It is easier to preserve digital files when they are captured consistently and well documented. The expense of doing so is more justifiable if the files offer continuing value and functionality.

Access

A digital master should be capable of supporting a range of users' needs through the creation of derivatives for printing, display, and image processing. The richer the digital master, the better the derivatives in terms of quality and processibility. User expectations will likely be more demanding over time—the digital master should be rich enough to accommodate future applications. Rich masters will support the development of cultural heritage resources that are comparable and interoperable across disciplines, users, and institutions.

Cost

Creating a high quality digital image may cost more initially, but will be less expensive than creating a lower quality image that fails to meet long-term requirements and results in the need to re-scan. Labor costs associated with identifying, preparing, inspecting, indexing, and managing digital information far exceed the costs of the scan itself.

The key to image quality is not to capture at the highest resolution or bit depth possible, but to match the conversion process to the informational content of the original, and to scan at that level—no more, no less. In doing so, one creates a master file that can be used over time. Long-term value should be defined by the intellectual content and utility of the image file, not limited by technical decisions made at the point of conversion.

Benchmarking For Digital Capture

Cornell advocates a methodology for determining conversion requirements that is based on the following:

Assessing document attributes (detail, tone, color)

Defining the needs of current and future users

Objectively characterizing relevant variables (e.g., size of detail, desired quality, resolving power of system)

Correlating variables to one another via formulas

Confirming results through testing and evaluation

Benchmarking Resolution Requirements For Printed Text

Cornell adopted and refined a digital Quality Index (QI) formula for printed text that was developed by the C10 Standards Committee of AIIM. This formula was based on translating the Quality Index method developed for preservation microfilming standards to the digital world. The QI formula for scanning text relates quality (QI) to character size (h) in mm and resolution (dpi). As in the preservation microfilming standard, the digital QI formula forecasts levels of image quality: barely legible (3.0), marginal (3.6), good (5.0), and excellent (8.0).

TABLE

| Metric/English Conversion |
|---|
| 1 mm = .039 inches |
| 1 inch = 25.4 mm |

The formula for bi-tonal scanning provides a generous over sampling to compensate for misregistration and reduced quality due to thresholding information to black and white pixels.

Bi-tonal QI Formula for Printed Text
QI = (dpi × .039 h)/3
h = 3 QI/.039 dpi
dpi = 3 QI/.039 h Note: if the measurement of h is expressed in inches, omit the .039

Resolution Requirements For Printed Text: Comparison of letters scanned at different resolutions.

Some printed text will require grayscale or color scanning for the following reasons:
- Pages are badly stained
- Paper has darkened to the extent that it is difficult to threshold the information to pure black and white pixels
- Pages contain complex graphics or important contextual information (e.g., embossments, annotations)
- Pages contain color information (e.g., different colored inks)

Benchmarking Resolution Requirements Based On Stroke Width

The QI method was designed for printed text where character height represents the measure of detail. Manuscripts and other non-textual material representing distinct edge-based graphics, such as maps, sketches, and engravings, offer no equivalent fixed metric. For many such documents, a better representation of detail would be the width of the finest line, stroke, or marking that must be captured in the digital surrogate. To fully represent such a detail, at least 2 pixels should cover it. For example, an original with a stroke measuring 1/100 inch must be scanned at 200 dpi or greater to fully resolve its finest feature. For bi-tonal scanning, this requirement would be higher (say 3 pixels/feature) due to the potential for sampling errors and the thresholding to black and white pixels. A feature can often be detected at lower resolutions, on the order of 1 pixel/feature, but quality judgments come into play.

Cornell has developed the following correlation of perceived image quality to pixel coverage:

TABLE

Quality Index for Stroke Rendering

| QI | Quality Assessment |
|---|---|
| 2 | excellent |
| 1.5 | good |
| 1 | questionable, confirm quality onscreen |
| <1 | poor to unacceptable |

Grayscale/Color QI Formula for Stroke
dpi = QI/.039 w

This formula correlates QI with dpi and stroke width (w) measured in mm. QI in this case is based on the quality assessment above, which correlates to the number of pixels covering the stroke (e.g., 2=excellent). Note: if the measurement of w is expressed in inches, omit the 0.039.

For bi-tonal scanning, the formula is adjusted to compensate for feature drop out in the thresholding process:

Bi-tonal QI Formula for Stroke
dpi = 1.5 QI/.039 w

Many items falling into this category exhibit features beyond simple edge-based representation, and resolution will not be the sole determinant of image quality. For example, a number of institutions have recommended scanning all manuscripts in grayscale or color.

Benchmarking Resolution Requirements For Continuous Tone Documents

Resolution requirements for photographs and other continuous tone documents are difficult to determine because there is no obvious fixed metric for measuring detail. Detail may be defined as relatively small-scale parts of a document, but this assessment may be highly subjective. We might agree that street signs visible under magnification in a cityscape should be rendered clearly, but what about individual hairs or pores in a portrait? At the granular level, photographic media are characterized by random clusters of irregular size and shape, which can be practically meaningless or difficult to distinguish from background noise. Many institutions have avoided the issue of determining detail by basing their resolution requirements on the quality that can be obtained from prints generated at a certain size (e.g., 8×10-inch) from a certain film format (e.g., 35 mm, 4×5-inch). The important thing to remember about continuous tone documents is that tone and color reproduction is as important, if not more so, than resolution in determining image quality.

Benchmarking Resolution Requirements For Halftones

Halftones are particularly difficult to capture digitally, as the screen of the halftone and the grid of the digital image often conflict, resulting in distorted images with moiré (e.g., wavy patterns). Although a number of scanners have developed special halftoning capabilities, one of the more consistent ways to scan is in grayscale at a resolution that is four times the screen ruling of the halftone. This screen ruling can be determined using a halftone screen finder, available from graphic arts supply houses. For high-end materials, such as fine art reproductions, this requirement will result in high resolutions (on the order of 700-800 dpi). For most halftones, 400 dpi, 8-bit capture is probably sufficient. Cornell did not discern any noticeable moiré when scanning a range of 19th- and early 20th-century halftones at that resolution. Lower resolutions can be used when special treatment scanning is employed. The Library of Congress has identified four distinct approaches to imaging halftone documents.

Quality control (QC) is an integral component of a digital imaging initiative to ensure that quality expectations have been met. It encompasses procedures and techniques to verify the quality, accuracy, and consistency of digital products. Quality control strategies can be implemented at different levels:

Initial Evaluation
A subset of documents (to be converted in-house or by a service provider) is used to verify the appropriateness of technical decisions made during benchmarking. This evaluation occurs prior to implementing the project.

Ongoing Evaluation
The same quality assurance process used to confirm benchmarking decisions can be scaled and extended to the whole collection to ensure quality throughout the digital imaging initiative.

Metadata describes various attributes of information objects and gives them meaning, context, and organization. Descriptive metadata theory and practice is a familiar area for many as its roots are embedded in the cataloging of print publications. In the digital realm, additional categories of metadata have emerged to support navigation and file management.

Metadata Types And Their Functions

For practical purposes, the types and functions of metadata can be classified into three broad categories: descriptive, structural, and administrative. These categories do not always have well-defined boundaries and often exhibit a significant level of overlap. For example, administrative metadata may include a wide range of information that would be considered descriptive and structural metadata.

Metadata Creation

Metadata creation and implementation are resource-intensive processes. Balance costs and benefits in developing a metadata strategy, taking into consideration the needs of current and future users and collection managers. Identify metadata requirements at the onset of an imaging initiative. These requirements should be tightly linked to functions that must be supported (e.g., rights management, resource discovery, and long-term care).

Consider the following issues:
- Although some metadata elements are static (e.g., date of creation, scanning resolution), certain fields (e.g., migration information) may continue to evolve and require continuous updating and maintenance.
- The creation and management of metadata is accomplished through manual (creating a Dublin Core record) and automated (generating a keyword index from OCR'ed text) techniques. Similarly, metadata quality control will be based on a mix of manual (evaluating the quality of subject access categories and keywords) and automated (using an SGML parser to validate tags) processes.
- Metadata can be internal (file naming, directory structuring, file headers, OCR, SGML) or external (external indexes and databases). The key factor in decision making is evaluating whether the location supports functionality and resource management. For example, TIFF file headers are instrumental in recording metadata internally; however, this metadata is usually lost when the TIFF files are converted to other file formats, such as JPEG or GIF.

There are several standards in development to facilitate interoperability among different metadata schemes. The Resource Description Framework (RDF) is an XML-based application to provide a flexible architecture for managing diverse metadata in the networked environment. The goal of the Digital Imaging Group's Metadata For Digital Images (DIG 35) initiative is to define a standard set of metadata that will improve interoperability between devices, services, and software, thus making it easier to process, organize, print, and exchange digital images. The MPEG-7 (Moving Picture Experts Group) initiative targets audio-visual content description and aims to standardize a set of description schemes and descriptors, a language to specify description schemes, and a scheme for coding the description. The Interoperability of Data in E-Commerce Systems (<indecs>) project is an international collaboration to develop a metadata framework that supports network commerce of intellectual property.

EXAMPLE

What kinds of metadata will be created for a journal collection that is converted as 600 dpi, 1-bit TIFF 6.0 images? The following metadata tasks might be undertaken. Each is identified by its principle metadata type (S=structural, D=descriptive, A=administrative). Note: The RLG Model RFP provides an example of metadata requirements for a text imaging project.
- Assign file names and directory structures to the image files and the associated metadata files. (S)
- Create or update MARC records (Fields 100, 110, 245, 260, 440, 650, etc.). (D)
- Create Dublin Core records. (D)
- Use MARC Field 007 to record digital preservation and reformatting information. (A)
- Use appropriate TIFF 6.0 file headers to record technical information, e.g., ImageWidth, ImageLength, Compression, StripOffsets, RowsPerStrip, StripByteCounts, Xresolution, Yresolution, Resolution Unit; BitsPerSample. (A)
- Assign persistent, globally-unique, and location-independent file names (PURL or Handle). (D)
- Use appropriate TIFF 6.0 file headers for image description (Field 270) to record descriptive elements essential for identifying the file (e.g., project ID, institution, collection, year of publication, title, author, image sequence number). (D)
- Create a database to store and manage bibliographic information from the cumulative journal indexes to enable structured vocabulary search (e.g., journal volume, issue, title, author, beginning and ending page number). (D, S)
- Use TEI Lite SGML encoding to map the basic structural elements of the journals, such as volume, issue, title, author name, beginning and ending pages for each article, to facilitate online searching and browsing. (S)
- OCR images to provide free-text key word access. (D)
- Create HTML tags with Dublin Core information to facilitate resource discovery. (D)
- Register the Web site with relevant subject directories, specialized subject portals, and gateways to increase coverage by Web search engines. (D)

Example 2

What kinds of metadata will be collected and recorded for a collection of photographs?

In addition to many of the elements suggested above, consider whether to.
- Enhance an existing finding aid, and SGML-encode it using the EAD (Encoded Archival Description) Document Type Definition to create a map of the collection for searching and presentation. This will facilitate interoperability with other EAD-encoded finding aids (D, S, A)

Technical infrastructure refers loosely to the components that make digital imaging possible. The entire process is sometimes called the digitization chain, suggesting a series of logically ordered steps. In actual practice, the digitization chain can have side branches, loops, and recurring steps, but for simplicity's sake, we present it here as if it were linear.

The Digitization Chain

The technology necessary to navigate from one end of the digitization chain to the other consists mainly of hardware, software, and networks. These are the focus of this section. A truly comprehensive view of technical infrastructure also includes protocols and standards, policies and procedures (for workflow, maintenance, security, upgrades, etc.), and the skill levels and job responsibilities of an organization's staff.

However, even the nuts and bolts of the technical infrastructure cannot be evaluated in complete isolation. Related actions and considerations that will affect decisions about the technical infrastructure include:

Determining quality requirements based on document attributes (Benchmarking)

Assessing institutional strengths and weaknesses, timetable, and budget (Management)

Understanding user needs (Presentation)

Assessing long-term plans (Digital Preservation)

Technical infrastructure decisions require careful planning because digital imaging technology changes rapidly. The best way to minimize the impact of depreciation and obsolescence is through careful evaluation, and the avoidance of unique, proprietary solutions. If equipment choices are well-matched to intended uses and expected outcomes and synched to realistic timetables, return on investment will be maximized.

Image creation deals with the initial capture or conversion of a document or object into digital form, typically with a scanner or digital camera. There may then be one or more file or image processing steps applied to the initial image, which may alter, add, or extract data. Broad classes of processing include image editing (scaling, compression, sharpening, etc.) and metadata creation.

Computers and their network interconnections are integral components of the digitization chain. Each link in the chain involves one or more computers and their various components (RAM, CPU, internal bus, expansion cards, peripheral support, storage devices, and networking support). Depending on the specific computing demands of each component, configuration requirements will change.

System Integration: Connecting The Chain

Keep a few overarching policy recommendations and caveats in mind as we discuss the technical infrastructure:

1) Consider using a systems integrator who can guarantee that all components interoperate without difficulty. If you decide to do all component selection yourself, keep the number of devices to a minimum.

2) Choose products that adhere to standards and have wide market acceptance and strong vendor support.

3) Despite all your best efforts, some things will go wrong, so be prepared for headaches. Claims to the contrary, plug'n play doesn't always work. Digital imaging components must sometimes be adapted for library/archives use in creative ways.

4) Don't skimp—you'll pay more in the long run. If you're serious about making a commitment to digital imaging, buy quality and budget for upgrades and replacements at regular intervals. Waiting until you're stuck with obsolete, unsupported equipment or file formats can lead to timewasting and expensive problems.

5) Involve technical staff early and often in planning discussions. As much as we'd like to think of it as linear, the digitization chain is really a complex shape that folds back on itself in several places. Technical staff can help identify the weak links resulting from the interdependencies of various steps in the process.

Using the Web to make retrospective resources accessible to a broad public raises issues of image quality, utility, and delivery at the user's end. User studies have concluded that researchers expect fast retrieval, acceptable quality, and complete display of digital images. This leads cultural institutions to confront a whole host of technical issues that do not exist in the analog world.

Technical Links Affecting Display
File format and compression used
Web browser capabilities
Network connections
Scaling routines and programs
End user computer and display capabilities File Formats And Compression Factors in choosing a file format for display include the following:
Bit depths supported
Compression techniques supported
Color management
Proprietary vs. standard file format
Technical support (Web browser, user computer and display capabilities)
Metadata capability
Fixed vs. multi-resolution capability
Additional features, e.g., interlacing, transparency Although there is a multitude of file formats available, the Table on Common Image File formats summarizes important attributes for the eight most common image formats in use today. Despite interest in finding alternative formats for master files, TIFF remains the defacto standard. For access images, GIF and JPEG files are the most common. PDF, while not technically a raster format, is used extensively for printing and viewing multi-page documents containing image files. PDF also offers a zooming feature that supports variant views of an image. PNG has been approved by the World Wide Web Consortium (W3C) for Web use, and as browser support for the format becomes more complete, PNG may replace GIF for network access. (See an RLG DigiNews FAQ on the future of PNG.)

As larger and more complex images are being intended for Web access, there is increasing interest in file formats and compression techniques that support multi-resolution capabilities, such as FlashPix, LuraWave, JTIP and wavelet compression, such as MrSID from LizardTech or Enhanced Compressed Wavelet from ER Mapper. JPEG 2000 also utilizes wavelet compression and supports multi-resolution capabilities. DjVu is a recently-developed format optimized for scanned documents. It offers efficient compression of both bi-tonal images (using the JBIG2 variant, JB2), as well as of full color images, using wavelet compression. Unfortunately, all of these formats require users to download and install plug-ins in order to view them on the Web.

Resolution on Demand: Several new file formats and compression techniques allow users to zoom in by clicking on a section to view at a higher resolution.

The compression technique used and level of compression applied can affect both speed of delivery and resulting image quality. The Table on Compression summarizes important attributes for common compression techniques. AIIM offers a questionnaire (AIIM TR33-1998) to assist in choosing a compression method to match user requirements.

The following Table compares file sizes resulting from using various compression programs on a 300 dpi, 24-bit image of an 8.45×12.75-inch color map.

TABLE

File Size and Compression Comparison

| Compression Type | File Size | Compression Ratio |
| --- | --- | --- |
| Uncompressed TIFF | 28.4 MB | — |
| TIFF-LZW | 21.2 MB | 1:1.34 |
| GIF (8 bit) | 4.0 MB | 1:6 |
| JPEG-low | 10.4 MB | 1:2.7 |
| JPEG-high | 1.2 MB | 1:24 |
| PNG | 20.8 MB | 1:1.37 |

Web Browser Capabilities

The Web supports few raster file formats: JPEG, GIF, and incomplete support for PNG. Other formats require use of a specialized viewer, such as a plug-in, applet, or some other external application. This limitation tends to dampen use as it places more demand on the user's end. In some circumstances, the value of the format is sufficiently compelling to overcome user resistance, as is the case with PDF files. Adobe lessens user constraints by supplying a browser plug-in with its PDF reader. If the stand-alone Acrobat Reader is already available when the browser is installed, most will self-configure to launch it when a PDF file is encountered. Some institutions convert non-supported formats or compression schemes on the fly to ones that are Web-supported (e.g., wavelet to JPEG) in response to user request.

Network Connections

Users probably care most about speed of delivery, as noted earlier. Several variables control access speed, including the file size, network connections and traffic, and the time to read the file from storage and to open it on the desktop.

Scaling Routines And Programs

Institutions have constrained file size by reducing resolution, bit depth, and/or by applying compression. The goal is to speed delivery to the desktop without compromising too much image quality. Scaling refers to the process of creating access versions from a digital master without having to rescan the source document. The program and scripts used for scaling will affect the quality of the presentation. For instance, scaling can introduce moiré in illustrations, such as halftones, when resolution is reduced without attention paid to screen interference.

Monitor Capabilities

User satisfaction with on-screen images will depend on the capabilities of display systems. In addition to speed of delivery, users are interested in image quality (legibility and color fidelity adequate to a task); full display of images on screen; and to a lesser degree accurate representations of the dimensions of original documents. Unfortunately, given current monitor technology, meeting all these criteria at the same time is often not possible.

Screen size and pixel dimensions

In contrast to scanners and printers, current monitors offer relatively low resolution. Typical monitors support desktop settings from a low of 640×480 to a high of 1,600×1,200, referring to the number of horizontal by vertical pixels painted on the screen when an image appears.

The amount of an image that can be displayed at once depends on the relationship of the image's pixel dimensions (or dpi) to the monitor's desktop setting. The percentage of an image displayed can be increased several ways: by increasing the screen resolution and/or by decreasing the image resolution.

Increasing screen resolution. Think of the desktop setting as a camera viewfinder. As the monitor setting dimensions increase, more of an image may be viewed.

Increasing Screen Resolution: Viewing area comparison for a 100 dpi (original document size 8"×10") image displayed at different monitor settings. The pixel dimension for the image is 800×1,000.

Decreasing image resolution. One can also increase the amount of an image displayed by reducing the resolution of the image through scaling.

Balancing Legibility and Completeness: Displayed at 200 dpi on a 800×600 monitor, one can only see a small portion of the page (left). At 60 dpi, the whole page is fully displayed, but at the expense of legibility (bottom-right). Scaling the image to 100 dpi offers a compromise by maintaining legibility and limiting scrolling to one dimension (top-right).

You can calculate the percent of display if you know the following variables: 1) document dimensions and image dpi, or pixel dimensions of image, and 2) desktop setting Dimensional Fidelity At times, it may be important to represent an image on-screen at the actual size of the original scanned document. This can only be achieved when the digital image resolution equals the monitor's resolution (dpi). The Blake Archive Project has developed a Java applet, called the Image Sizer, for representing images at the actual size of the original.

The goal of digital preservation is to maintain the ability to display, retrieve, and use digital collections in the face of rapidly changing technological and organizational infrastructures and elements. Issues to be addressed in digital preservation include:

- Retaining the physical reliability of the image files, accompanying metadata, scripts, and programs (e.g., make sure that the storage medium is reliable with back-ups, maintain the necessary hardware and software infrastructure to store and provide access to the collection)
- Ensuring continued usability of the digital image collection (e.g., maintain an up-to-date user interface, enable users to retrieve and manipulate information to meet their information needs)
- Maintaining collection security (e.g., implement strategies to control unauthorized alteration to the collection, develop and maintain a rights management program for fee-based services)

Why is Digital Preservation so Challenging?

Challenges are multi-faceted and can be grouped into two categories:

Technical Vulnerabilities

- Storage media, due to physical deterioration, mishandling, improper storage, and obsolescence.
- File formats and compression schemes, due to obsolescence or over-reliance on proprietary and unsupported file and compression formats.
- Integrity of the files, including safeguarding the content, context, fixity, references, and provenance.
- Storage and processing devices, programs, operating systems, access interfaces, and protocols that change as technology evolves (often with limited backward compatibility).
- Distributed retrieval and processing tools, such as embedded Java scripts and applets.

Organizational and Administrative Challenges
   Insufficient institutional commitment to long-term preservation
   Lack of preservation policies and procedures
   Scarcity of human and financial resources
   Varying (and asynchronous) stakeholder interests in the creation, maintenance, and distribution of digital image collections
   Gaps in institutional memory due to staff turnover
   Inadequate record keeping and administrative metadata
   Evolving nature of copyright and fair-use regulations that apply to digital collections Technical Strategies Enduring Care should be seen as an ongoing strategy for monitoring the wellbeing of digital resources. Vigilant management of the collection includes housing images and accompanying files in secure, reliable media and locations; storing and handling media according to industry guidelines to optimize their life expectancy; and implementing periodic and systematic integrity checks and backups.

Refreshing involves copying content from one storage medium to another. As such it targets only media obsolescence and is not a full-service preservation strategy. An example of refreshing is copying a group of files from CD-ROMs to DVDs. Refreshing should be seen as an integral part of an enduring care policy.

Migration is the process of transferring digital information from one hardware and software setting to another or from one computer generation to subsequent generations. For example, moving files from an HP-based system to a SUN-based system involves accommodating the difference in the two operating environments. Migration can also be format-based, to move image files from an obsolete file format or to increase their functionality.

Emulation involves the re-creation of the technical environment required to view and use a digital collection. This is achieved by maintaining information about the hardware and software requirements so that the system can be reengineered.

Technology Preservation is based on preserving the technical environment that runs the system, including software and hardware such as operating systems, original application software, media drives, and the like.

Digital Archeology includes methods and procedures to rescue content from damaged media or from obsolete or damaged hardware and software environments.

Organizational Strategies

Technical solutions alone are insufficient to ensure the longevity of digital resources. A holistic approach is called for that recognizes the interdependencies between technical and organizational components. Among issues to be addressed in such a strategy are staffing and training needs, financial requirements, criteria for re-selection, and preservation metadata needs.

Although it is useful to examine each issue in detail, successful solutions require the integration of administrative and technical considerations. For example, an institution may have a well-developed strategy for day-to-day maintenance of image collections that codifies how to monitor, test, and refresh files. However, unless there is a concomitant financial and administrative plan that outlines how to staff and finance these activities over time, the maintenance plan may not succeed in the long-term. Likewise, having dedicated and qualified staff will not suffice unless there is a technical appreciation for the lifecycle management of digital assets. Effective management of digital collections will require institutions to develop and follow a business plan for evaluating long-term preservation and access requirements, identifying costs and benefits, and assessing risks.

The following initiatives are examples of promising, practical approaches to digital preservation: OAIS (Open Archival Information System) reference model provides a framework for long-term digital preservation and access, including terminology and concepts for describing and comparing archival architectures. Both the NEDLIB and Cedars 1 projects have adopted the OAIS reference model as a basis for their explorations.

Cedars 1 (CURL Exemplars in Digital Archives) project aims to produce strategic frameworks for digital collection management policies, and to promote methods appropriate for long-term preservation of different classes of digital resources, including the creation of appropriate metadata.

Networked European Deposit Library (NEDLIB) is a collaborative project of European national libraries to build a framework for a networked deposit library. Among the key issues it explores are archival maintenance procedures and the link between metadata requirements and preservation strategies.

PANDORA (Preserving and Accessing Networked Documentary Resources of Australia) project has successfully established an archive of selected Australian online publications, developed several digital preservation policies and procedures, drafted a logical data model for preservation metadata, and outlined a proposal for a national approach to the long-term preservation of these publications.

Institutions inaugurating digital imaging initiatives must address managerial issues. These can be characterized variously, but they all boil down to correlating resources and processes with project goals. Project goals, such as enhancing access or promoting efficiencies must be translated into project deliverables, such as digital image files, accompanying metadata, and Web-accessible databases. A manager will have a greater chance of completing the project successfully if she has a hand in defining project goals and deliverables. The figure below places goals and deliverables at the center of project management. Radiating out from them are institutional resources, including collections, personnel, finances, space, time, and technical capabilities. These elements will enhance or constrain digitization efforts. The outer circle represents the processes or steps that encompass digital imaging initiatives.

Management Wheel: The figure demonstrates the organic nature of digital imaging, with interdependencies connecting goals, resources, and processes.

Among responsibilities that fall to project managers are the following:
   Setting realistic timelines, objectives, and expectations
   Determining the best approach for accomplishing project goals
   Developing and defending budgets
   Facilitating communication among project participants, including outside vendors
   Monitoring production, quality, and costs
   Looking beyond project's end Setting Realistic Timelines, Objectives, and Expectations It is the manager's responsibility to recognize and plan for a project's life cycle, which encompasses the following stages:
   Pre-project activities, including identifying goals and methodologies, securing resources and institutional commitment
   Ramping up, the stage from project initiation to first scanning batch Production, where the greatest productivity occurs in the middle of this phase Project wind down, a time to conclude the effort and for dealing with problems that have been set aside Post-project activities, principally associated with mainstreaming maintenance responsibilities for digital products Recognizing the life cycle of a project enables a manager to develop a project timeline, where the beginning and end are clearly defined. In between, the manager must marshal resources to create project deliverables on time and within budget. Project steps and workflow must be characterized, and the several Web sources listed at the end of this section provide useful information that may be adapted to your particular circumstances.

Timeline development is facilitated if the institution has experience with similar efforts or can undertake a pilot phase where time and resources associated with project steps can be quantified. Creating a base level timeline using a software program capable of generating a Gantt chart such as Microsoft Project enables the manager to note process sequences and dependencies that will be affected by unanticipated delays in production. A common mistake is to overestimate production capabilities, especially in the early phases of a project. These tools facilitate project monitoring, enabling managers to respond more effectively to bottlenecks, competing requirements, and the like.

The present invention provides methods and apparatuses for digital imaging and the processing of the documents before, during, and after the imaging.

II. SUMMARY OF THE INVENTION

According to one aspect of the present invention, a new and improved process for archiving and digitizing documents is provided which enables a quicker, more efficient process.

In accordance with one aspect of the present invention, a method for digital archiving of associated documents includes sorting the associated documents into at least two categories related to length of processing time, labeling the associated documents according to the category selected for that document, placing the associated documents onto a conveyor, conveying the associated documents to a movable, oval-shaped table, digitally imaging the associated documents according to the categories selected for each associated document, color coding the processed files, the color coding relating to the post-processing procedure, and disposing of the associated document in accordance with the color coding.

In accordance with another aspect of the present invention, a method for digitally archiving associated documents includes sorting the associated documents into separate files, placing the files onto a movable table, digitally imaging the associated documents, coding the processed files, the coding relating to the post-processing procedure, and disposing of the files in accordance with the coding.

In accordance with another aspect of the present invention, the method further includes sorting the associated documents into at least two categories related to length of processing time and labeling the associated documents according to the category selected for that document.

In accordance with another aspect of the present invention, placing the files onto a movable table further includes placing the associated documents onto a conveyor and conveying the associated documents to a movable, oval-shaped table.

In accordance with another aspect of the present invention, after the step of coding the processed files, the coding relating to the post-processing procedure the method further includes placing the associated documents onto a second conveyor.

In accordance with another aspect of the present invention, disposing of the files in accordance with the coding further includes disposing of the files in accordance with the coding, the disposing being chosen from the group comprising: shredding the associated documents, recycling the associated documents, returning the associated documents to storage on site, returning the associated documents to storage off site, and customer packing and shipping.

In accordance with another aspect of the present invention, coding the processed files, the coding relating to the post-processing procedure further includes coding the processed files, the coding relating to the post-processing procedure, the coding chosen from the group comprising: ready to process, finished processing and destroy, finished processing and return and to customer, finished processing and return to long term storage, and finished processing and return to long term off site storage.

In accordance with another aspect of the present invention, a system for digital archiving includes a first conveyor, a table, the first conveyor removably connected to a first end of the table, the table having a center cut-out portion, the table having a rotating surface, a work station, the station located approximately in the middle of the cut-out portion, at least one digital imaging device, the device located approximately in the middle of the cut-out portion, and a second conveyor removably connected to a second end of the table.

In accordance with another aspect of the present invention, the system further includes a pre-digital operation table, the pre-digital operation table comprising means for coding associated documents according to length of processing time.

In accordance with another aspect of the present invention, the system further includes a post-operation table, the post-operation table comprising means for coding the associated documents with respect to post-processing procedures.

In accordance with another aspect of the present invention, the system further includes a first electronic scanning device for scanning the coding associated with the length of processing time, the first scanning device containing a computer processor and a computer readable medium for carrying instructions for separating the documents and a second electronic scanning device for scanning the coding associated with the post-processing procedures, the second scanning device containing a computer processor and a computer readable medium for carrying instructions for separating the documents.

In accordance with another aspect of the present invention, the system further includes a floor for the work station, the floor being selectively rotatable.

In accordance with another aspect of the present invention, the system further includes a controller for controlling the rotation of the floor.

In accordance with another aspect of the present invention, the at least one digital device further includes at least one digital device for short run time processing and at least one digital device for long run time processing.

In accordance with another aspect of the present invention, the system further includes at least one receptacle for shredding documents, at least one receptacle for temporary storage of documents being returned to long term or short term storage, and at least one receptacle for temporary storage of documents being returned to an associated customer.

In accordance with another aspect of the present invention, the system further includes a shredding device located in the at least one receptacle for shredding documents.

In accordance with another aspect of the present invention, the system further includes means for generating a report regarding the processing and post-processing of the associated documents.

In accordance with another aspect of the present invention, the system further includes means for tracking the associated documents.

In accordance with another aspect of the present invention, the system further includes a first conveyor chute for conveying documents into the at least one receptacle for shredding documents, a second conveyor chute for conveying documents into the at least one receptacle for temporary storage of documents being returned to long term or short term storage, and a third conveyor chute for conveying documents into the at least one receptacle for temporary storage of documents being returned to an associated customer.

In accordance with another aspect of the present invention, a method for digitally archiving associated documents includes providing a movable floor, sorting the associated documents into separate files, moving at least one portion of the floor to obtain at least one file, digitally imaging the associated documents, coding the processed files, the coding relating to the post-processing procedure, and disposing of the files in accordance with the coding.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

IV. DESCRIPTION OF THE INVENTION

Figure 1:
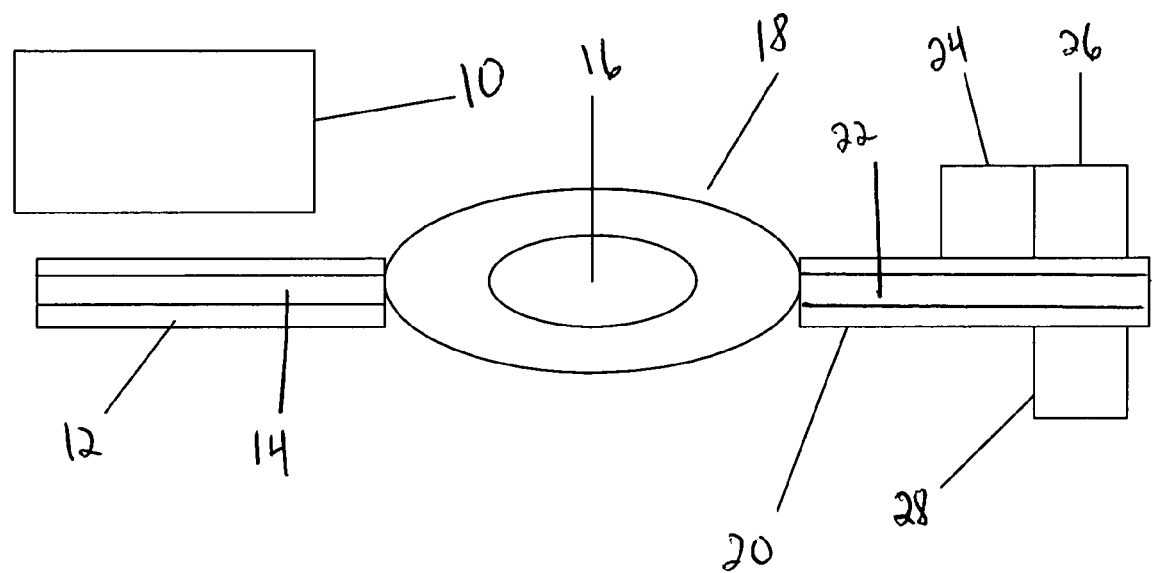
FIG. 1 is a plan view of the present invention.
Figure 2:
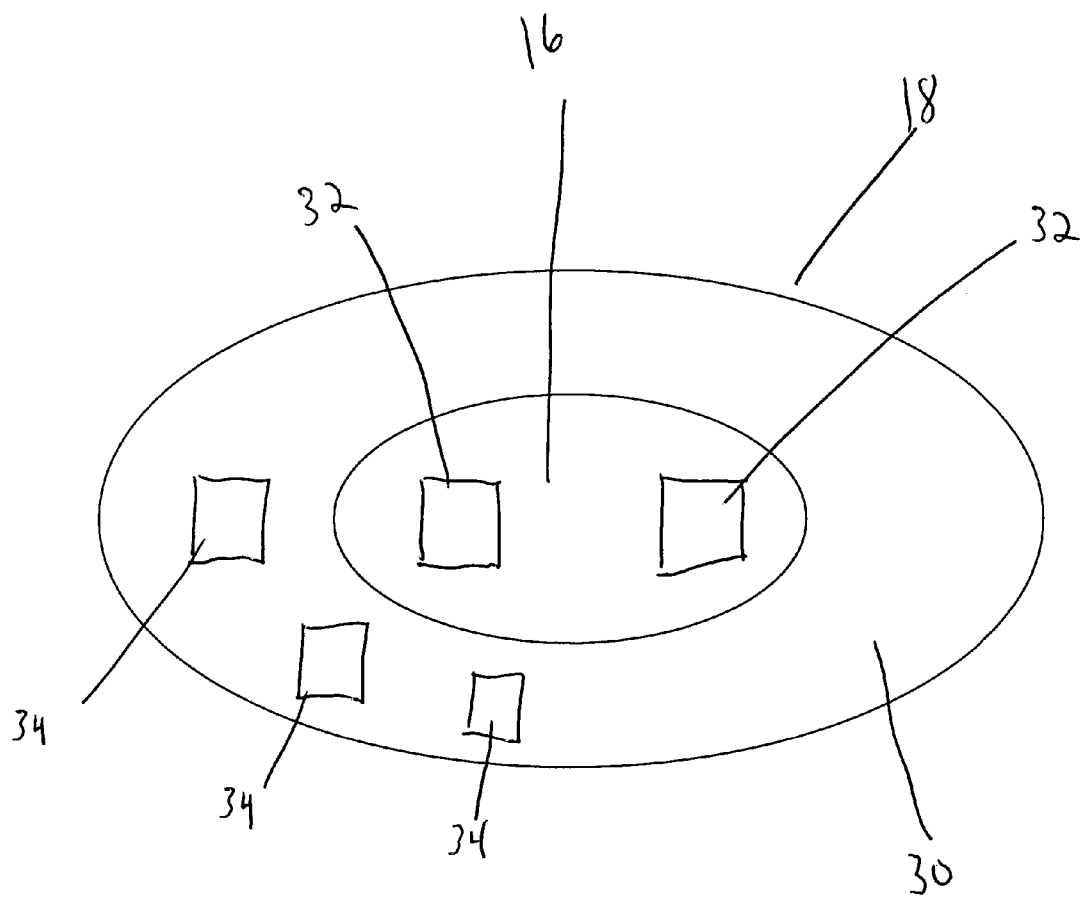
FIG. 2 is a plan view of the table of the present invention.
Figure 3:
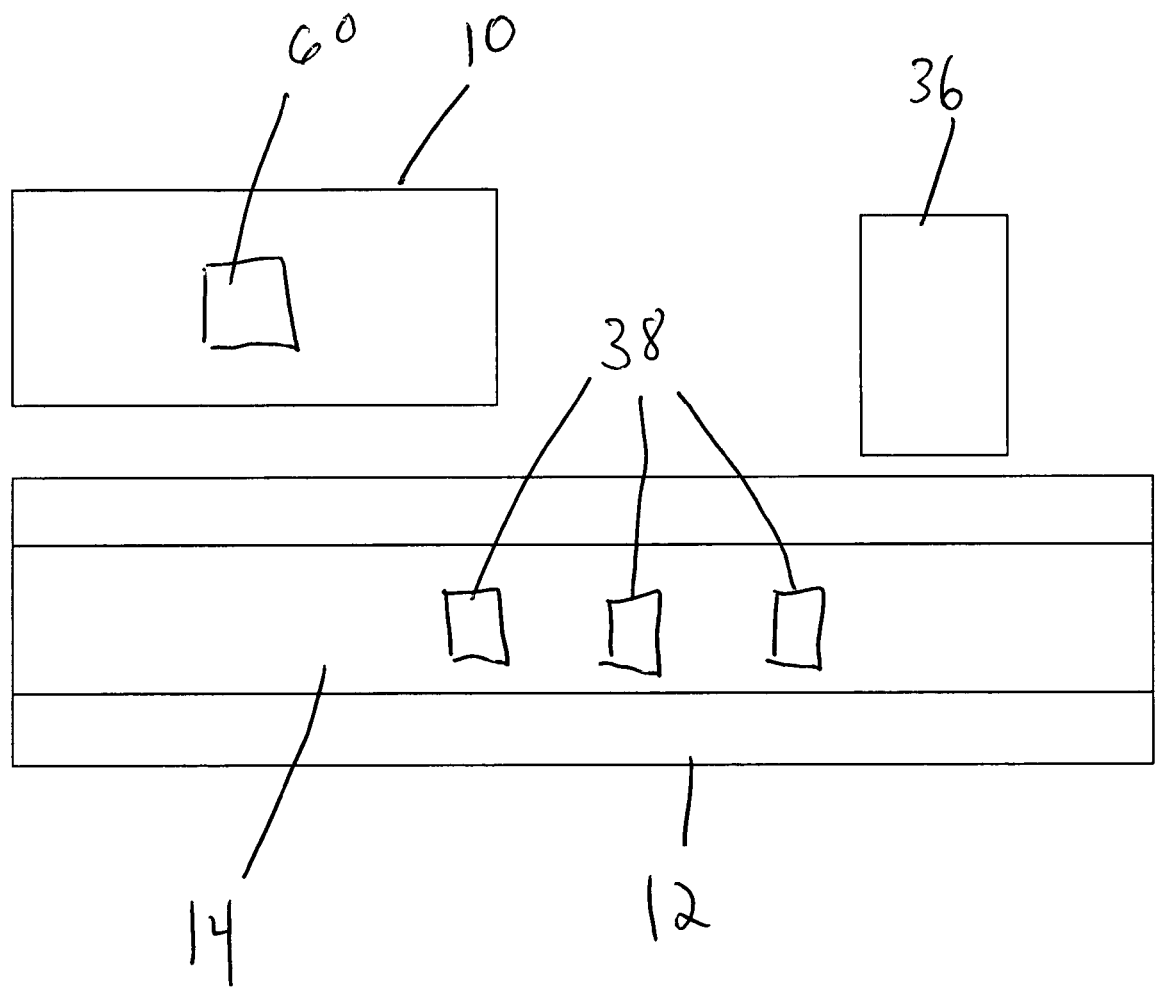
FIG. 3 is a plan view of the first conveyor and pre-digital operation table.
Figure 4:
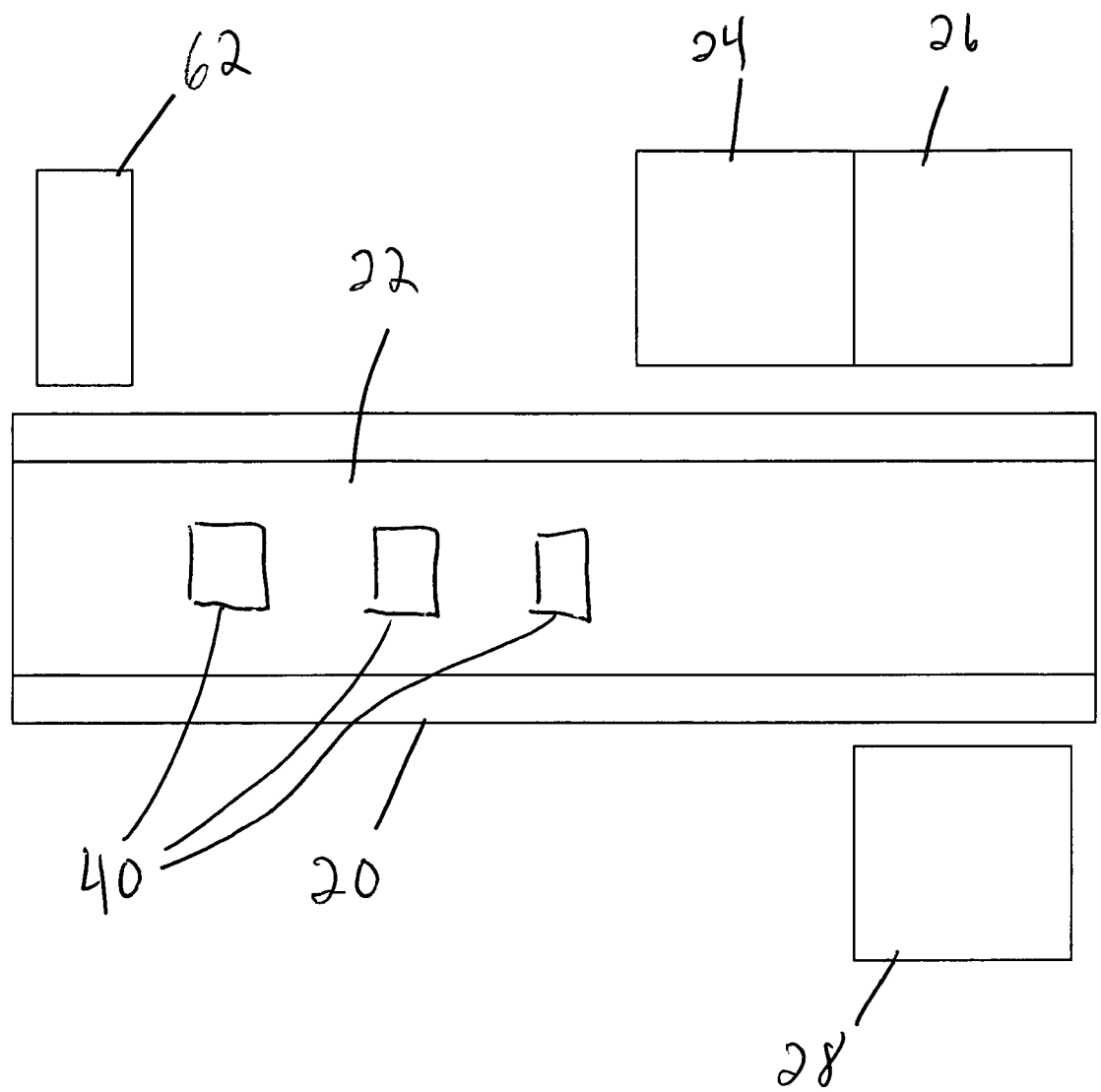
FIG. 4 is a plan view of the second conveyor and post-operation table.

Referring now to the drawings wherein the showings are for purposes of illustrating at least one embodiment of the invention only and not for purposes of limiting the same, FIGS. 1-4 show a pre-digital operation table 10, a first conveyor table 12, a first conveyor 14, a table 18, a cut-out portion 16, a second conveyor table 20, a second conveyor 22, a first receptacle 24, a second receptacle 26, a third receptacle 28, rotatable surface 30, digital imaging devices 32, sorted documents 34, unsorted documents 60, coded documents 38, first scanning device 36, second scanning device 62, and processed documents 40.

With continuing reference to FIGS. 1-4, the unsorted documents 60 are received from the customer and placed on the pre-digital operation table 10. The documents 60 are then coded for processing. In this particular embodiment, the documents 60 are coded for processing time, either short processing or long processing. However, it is to be understood that the documents 60 can be coded for any type of processing, as long as chosen using sound engineering and business judgment. The documents 60 are then placed on the first conveyor 14, and conveyed toward the table 18. In this embodiment, the first conveyor 14 is operated via electrical and mechanical means, but it is to be understood that the conveyor 14 can operate in any manner that will allow conveyance, as long as chosen using sound engineering judgment. The documents 60 are coded with a machine readable code so that the first scanning device 36 can determine which type of processing is required. As the conveyor 14 moves the coded documents 38 along, the first scanning device 36 reads the machine readable code on the documents 38.

With continuing reference to FIGS. 1-4, the documents 38 are then moved onto the rotating surface 30 of the table 18. It is to be understood that the documents 60 and documents 38 can be coded with non-machine readable code, and a human being can decipher the codes without use of the first scanning device 36. The operator (not shown) stands in the cut-out portion 16 of the table 18 and takes the sorted documents 34 and processes them with the digital imaging devices 32 in accordance with the codes. The rotating surface 30 of the table 18 enables the operator to access any of the documents 34 that he wishes. Once the documents 34 have been scanned, the documents 34 are then coded for post-processing. In this embodiment, the processed documents 40 are color coded for post-processing procedures. In this embodiment, red means "finished processing—destroy document," red/red means "finished processing—return to customer," red/blue means "finished processing—return to long term storage," and red/black means "finished processing—return to long term offsite storage." It is to be understood that any color combination can be used, and any coding scheme can be used, including non-machine readable coding, as long as chosen using sound engineering and business judgment.

In another embodiment of this invention, it is contemplated by this invention that the operator (not shown) controls the movement of the surface 30. It is also contemplated by this invention that the coding of the documents 34 can be directly linked to the table 18 and surface 30, such that the surface 30 moves in accordance with a pre-determined order of processing. For example, the documents 34 may include ten short-run documents 34 and twenty-five long run documents 34. The scanning device 36 can contain a computer processor and computer readable medium that allow for programming processing order of the documents 34. The computer processor in the scanning device 36 can be linked to the table 18 and surface 30, such that the programmed processing order will determine the movements of the surface 30, such that the documents 34 are imaged in a certain order.

With continuing reference to FIGS. 1-4, the processed documents 40 are placed on the second conveyor 22 (in this embodiment, the conveyor 22 operates in the same manner as first conveyor 14) and scanned by the second scanning device 62. As with the first scanning device 36, the second scanning device 62 reads the machine readable code on the processed documents 40 to determine the post-processing procedure. The documents 40 are then placed into the appropriate receptacles, the first receptacle 24 for documents 40 to be destroyed, the second receptacle 26 for documents 40 to be returned to the customer, and the third receptacle 28 for documents 40 to be sent to storage. Again, it is to be understood that the number of receptacles is not intended to limit the invention in any manner. Any number of receptacles, including none at all, can be used, as long as chosen using sound business and engineering judgment.

Figure 5:
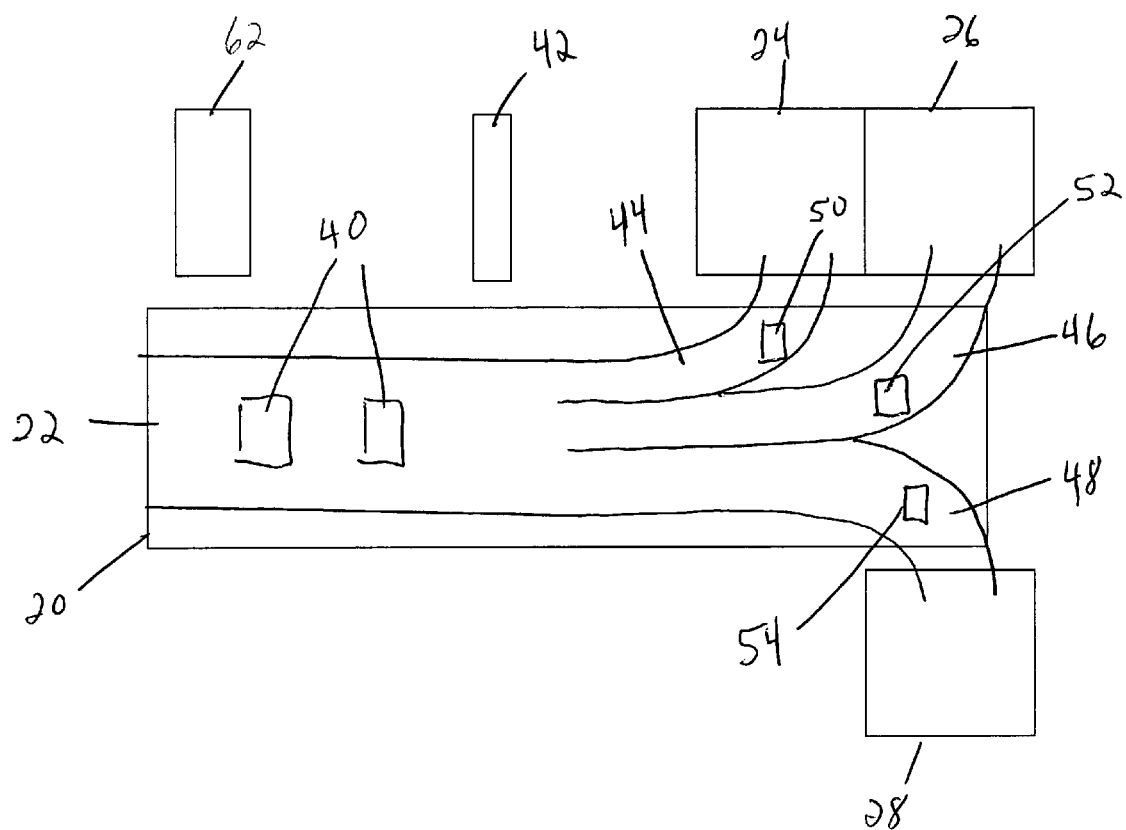
FIG. 5 is a plan view of another embodiment of the second conveyor and post-operation table; and, FIG. 6 is a plan view of another embodiment of the invention, showing a movable floor.

With reference now to FIG. 5, a second embodiment of the present invention is shown, with the processing before the second conveyor 22 being the same as the above embodiment. Once the documents 40 have been processed, and coded, an electronic arm 42 places the documents 40 onto conveyor chute 44, conveyor chute 46, or conveyor chute 48, depending upon the coding on the documents. The arm 42 receives information from the second scanning device 62 as to the coding on the documents 40. The arm 42 then places documents to be destroyed 50 onto chute 44, documents to be returned to the customer 52 onto chute 46, and documents to be placed in storage 54 onto chute 48. The documents 50, 52, 54 are then directed into the appropriate receptacles 24, 26, 28. In this embodiment, both the scanning device 62 and arm 42 have computer processors (not shown) which allow for the reading of machine readable code, as well as evaluating if-then statements, so that the documents 40 can be properly processed.

Figure 6:
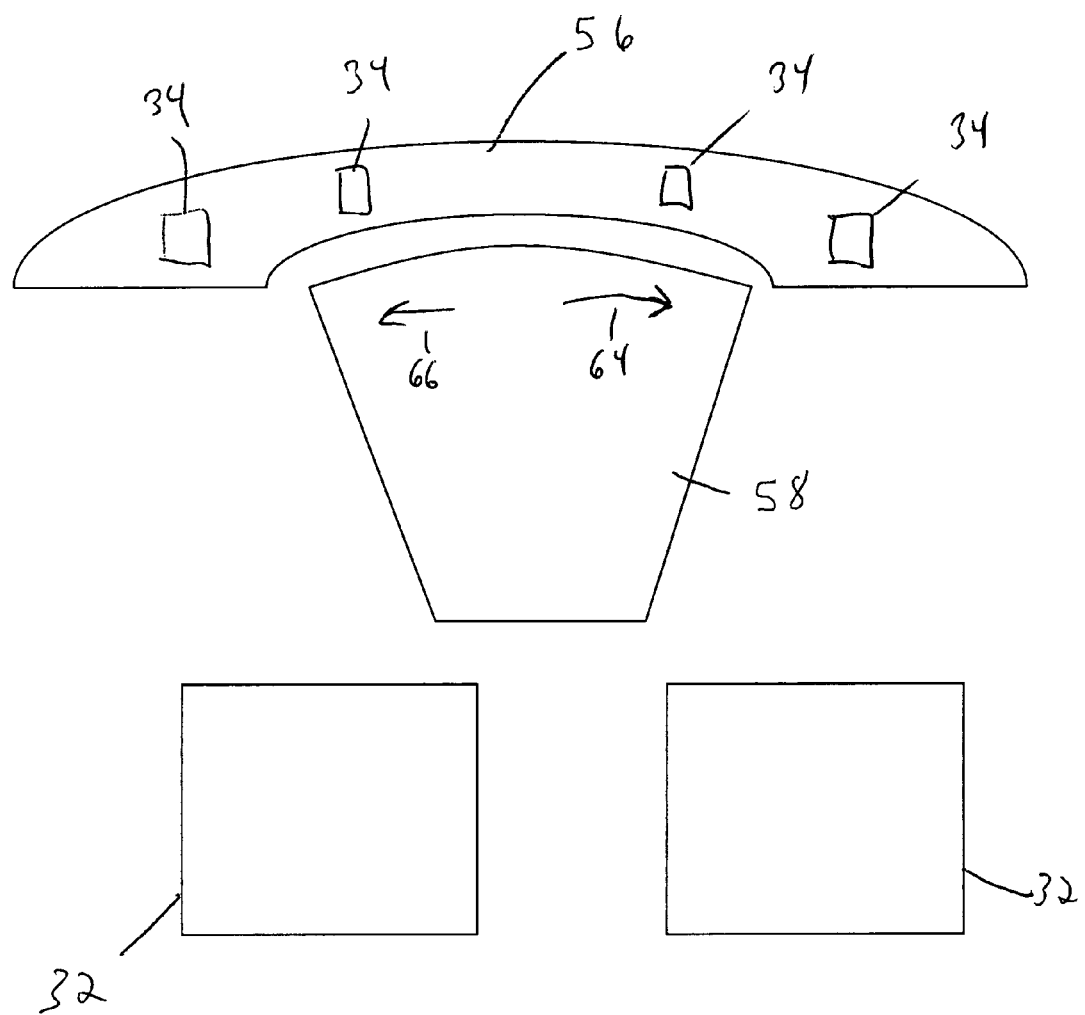

With reference now to FIG. 6, another embodiment of the invention is disclosed, showing a table 56, a rotating floor 58, and digital imaging devices 32. In this embodiment, the pre-processing and post-processing parts of the method are identical to either of the above described embodiments. In this embodiment, when the documents 34 are received, they are placed on table 56. The floor 58 is capable of movement in a direction to enable coverage of the table 56, as shown by arrow 64 and arrow 66 in FIG. 6. The operator (not shown) is moved to the various positions along the table 56 in order to obtain the documents 34. The operator takes the documents 34 and images them on the digital imaging devices 32. Although this embodiment shows a particular movement of the floor 58, it is to be understood that any means of moving the floor, and any number of directions of floor movement are encompassed within this embodiment. In this embodiment, the table 58 is stationary, although it is contemplated by this invention to include both a movable table and a movable floor. It is also contemplated by this invention to include control of the movement of the floor 58 by the operator.

At least one embodiment of the invention has been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

I claim:

1. A system for digital archiving, the system comprising:
   a first conveyor;
   a table, the first conveyor removably connected to a first end of the table, the table having a center cut-out portion, the table having a rotating surface;
   a work station, the station located approximately in the middle of the cut-out portion;
   at least one digital imaging device, the device located approximately in the middle of the cut-out portion; and,
   a second conveyor removably connected to a second end of the table.

2. The system of claim 1, wherein the system further comprises:
   a pre-digital operation table, the pre-digital operation table comprising means for coding associated documents according to length of processing time.

3. The system of claim 2, wherein the system further comprises:
   a post-operation table, the post-operation table comprising means for coding the associated documents with respect to post-processing procedures.

4. The system of claim 3, wherein the system further comprises:
   a first electronic scanning device for scanning the coding associated with the length of processing time, the first scanning device containing a computer processor and a computer readable medium for carrying instructions for separating the documents; and,
   a second electronic scanning device for scanning the coding associated with the post-processing procedures, the second scanning device containing a computer processor and a computer readable medium for carrying instructions for separating the documents.

5. The system of claim 4, wherein the system further comprises:
   a floor for the work station, the floor being selectively rotatable.

6. The system of claim 5, wherein the system further comprises:
   a controller for controlling the rotation of the floor.

7. The system of claim 6, wherein the at least one digital device further comprises:
   at least one digital device for short run time processing; and,
   at least one digital device for long run time processing.

8. The system of claim 7, wherein the system further comprises:
   at least one receptacle for shredding documents;
   at least one receptacle for temporary storage of documents being returned to long term or short term storage; and,
   at least one receptacle for temporary storage of documents being returned to an associated customer.

9. The system of claim 8, wherein the system further comprises:
   a first conveyor chute for conveying documents into the at least one receptacle for shredding documents;
   a second conveyor chute for conveying documents into the at least one receptacle for temporary storage of documents being returned to long term or short term storage; and,
   a third conveyor chute for conveying documents into the at least one receptacle for temporary storage of documents being returned to an associated customer.

10. The system of claim 8, wherein the system further comprises:
    a shredding device located in the at least one receptacle for shredding documents.

11. The system of claim 10, wherein the system further comprises:
    means for generating a report regarding the processing and post-processing of the associated documents.

12. The system of claim 11, wherein the system further comprises:
    means for tracking the associated documents.

13. A method for digitally archiving associated documents, the method comprising the steps of:
    providing a movable floor;
    sorting the associated documents into separate files;
    moving at least one portion of the floor to obtain at least one file;
    digitally imaging the associated documents;
    coding the processed files, the coding relating to the post-processing procedure; and,
    disposing of the files in accordance with the coding.

14. The method of claim 13, wherein the method further comprises the steps of:
    sorting the associated documents into at least two categories related to length of processing time; and, labeling the associated documents according to the category selected for that document.

15. The method of claim 14, wherein sorting the associated documents into separate files further comprises the step of:
placing the associated documents onto a conveyor; and,
conveying the associated documents to a table.

16. The method of claim 15, wherein after the step of coding the processed files, the coding relating to the post-processing procedure the method further comprises the step of:
placing the associated documents onto a second conveyor.

17. The method of claim 16, wherein disposing of the files in accordance with the coding further comprises the step of:
disposing of the files in accordance with the coding, the disposing being chosen from the group comprising: shredding the associated documents, recycling the associated documents, returning the associated documents to storage on site, returning the associated documents to storage off site, and customer packing and shipping.

18. The method of claim 17, wherein coding the processed files, the coding relating to the post-processing procedure further comprises the step of: coding the processed files, the coding relating to the post-processing procedure, the coding chosen from the group comprising: ready to process, finished processing and destroy, finished processing and return and to customer, finished processing and return to long term storage, and finished processing and return to long term off site storage.

* * * * *